United States Patent
Ingman et al.

(10) Patent No.: US 8,543,439 B2
(45) Date of Patent: *Sep. 24, 2013

(54) METHODS, SYSTEMS, AND COMPUTER-READABLE MEDIA FOR DETERMINING A PLURALITY OF TURFS FROM WHERE TO REALLOCATE A WORKFORCE TO A GIVEN TURF

(71) Applicant: AT&T Intellectual Property I, L.P., Atlanta, GA (US)

(72) Inventors: Robert Ingman, Peachtree City, GA (US); Robert Cole, Birmingham, AL (US); Richard Miller, Hoover, AL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/688,588

(22) Filed: Nov. 29, 2012

(65) Prior Publication Data
US 2013/0096974 A1    Apr. 18, 2013

Related U.S. Application Data

(63) Continuation of application No. 11/778,953, filed on Jul. 17, 2007, now Pat. No. 8,352,302.

(51) Int. Cl.
*G06Q 10/00* (2012.01)
(52) U.S. Cl.
USPC ....... 705/7.13; 705/7.14; 705/7.18; 705/7.37; 702/2; 702/57; 340/995.1; 340/995.14
(58) Field of Classification Search
None
See application file for complete search history.

(56) References Cited

U.S. PATENT DOCUMENTS

| | | | |
|---|---|---|---|
| 4,509,123 A * | 4/1985 | Vereen | 700/130 |
| 4,937,743 A | 6/1990 | Rassman et al. | |
| 5,155,689 A * | 10/1992 | Wortham | 455/456.3 |
| 5,214,281 A * | 5/1993 | Rowe | 250/253 |
| 5,467,268 A | 11/1995 | Sisley et al. | |
| 5,515,510 A * | 5/1996 | Kikinis | 709/203 |
| 5,542,088 A | 7/1996 | Jennings, Jr. et al. | |
| 5,590,269 A | 12/1996 | Kruse et al. | |
| 5,615,121 A | 3/1997 | Babayev et al. | |
| 5,623,404 A | 4/1997 | Collins et al. | |

(Continued)

FOREIGN PATENT DOCUMENTS

EP    1139247 A1    10/2001

OTHER PUBLICATIONS

Wennberg, J. "Finding Equilibrium in U.S. Physician Supply" Health Affairs vol. 12 Issue: 2 pp. 89-103 DOI: 10.1377/hlthaff.Dec. 2, 1989 Published: SUM 1993.*

(Continued)

*Primary Examiner* — Gurkanwaljit Singh
(74) *Attorney, Agent, or Firm* — Hartman & Citrin LLC

(57) ABSTRACT

Methods, systems, and computer-readable media provide for determining a plurality of turfs from where to reallocate a workforce to a given turf. According to embodiments, a method for determining a plurality of turfs from where to reallocate a workforce to a given turf is provided. According to the method, an indication of the given turf is received. Optimal turfs from where to reallocate technicians to the given turf are determined from a plurality of turfs. Visual cues for identifying at least a portion of the optimal turfs are generated.

20 Claims, 9 Drawing Sheets

(56) References Cited

U.S. PATENT DOCUMENTS

| | | | |
|---|---|---|---|
| 5,751,450 A * | 5/1998 | Robinson | 358/504 |
| 5,757,290 A * | 5/1998 | Watanabe et al. | 340/995.14 |
| 5,758,264 A * | 5/1998 | Bonta et al. | 455/67.7 |
| 5,778,345 A * | 7/1998 | McCartney | 705/2 |
| 5,920,846 A | 7/1999 | Storch et al. | |
| 5,943,652 A | 8/1999 | Sisley et al. | |
| 5,963,911 A | 10/1999 | Walker et al. | |
| 5,987,377 A | 11/1999 | Westerlage et al. | |
| 6,006,171 A | 12/1999 | Vines et al. | |
| 6,078,255 A | 6/2000 | Dividock et al. | |
| 6,134,530 A | 10/2000 | Bunting et al. | |
| 6,275,812 B1 | 8/2001 | Haq et al. | |
| 6,415,259 B1 | 7/2002 | Wolfinger et al. | |
| 6,445,968 B1 | 9/2002 | Jalla | |
| 6,578,005 B1 | 6/2003 | Lesaint et al. | |
| 6,633,900 B1 | 10/2003 | Khalessi et al. | |
| 6,639,982 B1 * | 10/2003 | Stuart et al. | 379/266.03 |
| 6,684,136 B2 | 1/2004 | Sinex | |
| 6,845,394 B2 * | 1/2005 | Ritche | 709/221 |
| 6,889,196 B1 | 5/2005 | Clark | |
| 6,904,408 B1 | 6/2005 | McCarthy et al. | |
| 6,934,379 B2 * | 8/2005 | Falcon et al. | 379/265.02 |
| 6,941,514 B2 | 9/2005 | Bradford | |
| 6,990,458 B2 | 1/2006 | Harrison et al. | |
| 7,065,456 B1 * | 6/2006 | Butka et al. | 702/57 |
| 7,085,280 B2 * | 8/2006 | Martin, IV | 370/408 |
| 7,127,412 B2 | 10/2006 | Powell et al. | |
| 7,171,375 B2 | 1/2007 | Clarke | |
| 7,222,082 B1 | 5/2007 | Adhikari et al. | |
| 7,283,971 B1 | 10/2007 | Levine et al. | |
| 7,346,531 B2 | 3/2008 | Jacobs | |
| 7,415,313 B2 * | 8/2008 | Brueckner et al. | 700/56 |
| 7,634,431 B2 * | 12/2009 | Stratton | 705/30 |
| 7,640,196 B2 * | 12/2009 | Weiss | 705/35 |
| 7,725,857 B2 * | 5/2010 | Foltz et al. | 716/119 |
| 7,729,939 B2 | 6/2010 | Richardson et al. | |
| 8,041,616 B2 | 10/2011 | Cullen et al. | |
| 8,249,905 B2 | 8/2012 | Ingman et al. | |
| 2001/0032103 A1 | 10/2001 | Sinex | |
| 2001/0037229 A1 | 11/2001 | Jacobs et al. | |
| 2001/0049619 A1 | 12/2001 | Powell et al. | |
| 2002/0010615 A1 | 1/2002 | Jacobs et al. | |
| 2002/0015064 A1 * | 2/2002 | Robotham et al. | 345/863 |
| 2002/0029161 A1 | 3/2002 | Brodersen et al. | |
| 2002/0040313 A1 | 4/2002 | Hunter et al. | |
| 2002/0065700 A1 | 5/2002 | Powell et al. | |
| 2002/0069018 A1 * | 6/2002 | Brueckner et al. | 701/300 |
| 2002/0069235 A1 * | 6/2002 | Chen | 709/104 |
| 2002/0076031 A1 * | 6/2002 | Falcon et al. | 379/265.11 |
| 2002/0125998 A1 | 9/2002 | Petite et al. | |
| 2002/0143469 A1 * | 10/2002 | Alexander et al. | 702/2 |
| 2002/0152290 A1 * | 10/2002 | Ritche | 709/221 |
| 2003/0033184 A1 * | 2/2003 | Benbassat et al. | 705/8 |
| 2003/0061068 A1 | 3/2003 | Curtis | |
| 2003/0069797 A1 | 4/2003 | Harrison | |
| 2003/0088492 A1 * | 5/2003 | Damschroder | 705/36 |
| 2003/0120538 A1 * | 6/2003 | Boerke et al. | 705/11 |
| 2003/0139955 A1 | 7/2003 | Kirii et al. | |
| 2003/0149598 A1 | 8/2003 | Santoso et al. | |
| 2003/0152045 A1 * | 8/2003 | Martin, IV | 370/328 |
| 2003/0167238 A1 | 9/2003 | Zeif | |
| 2003/0182052 A1 * | 9/2003 | DeLorme et al. | 701/201 |
| 2003/0187710 A1 | 10/2003 | Baumer et al. | |
| 2003/0216957 A1 | 11/2003 | Florence et al. | |
| 2003/0220734 A1 * | 11/2003 | Harrison et al. | 701/208 |
| 2003/0233278 A1 | 12/2003 | Marshall | |
| 2004/0010334 A1 * | 1/2004 | Bickley et al. | 700/99 |
| 2004/0019542 A1 | 1/2004 | Fuchs et al. | |
| 2004/0064436 A1 * | 4/2004 | Breslin et al. | 707/1 |
| 2004/0111311 A1 | 6/2004 | Ingman et al. | |
| 2004/0111312 A1 | 6/2004 | Ingman et al. | |
| 2004/0111313 A1 | 6/2004 | Ingman et al. | |
| 2004/0111634 A1 | 6/2004 | Ingman et al. | |
| 2004/0204969 A1 | 10/2004 | Wu | |
| 2004/0220825 A1 * | 11/2004 | Schwerin-Wenzel et al. | 705/1 |
| 2004/0234043 A1 | 11/2004 | Argo | |
| 2004/0249743 A1 * | 12/2004 | Virginas et al. | 705/37 |
| 2004/0254805 A1 * | 12/2004 | Schwerin-Wenzel et al. | 705/1 |
| 2005/0015504 A1 | 1/2005 | Dorne et al. | |
| 2005/0043986 A1 | 2/2005 | McConnell et al. | |
| 2005/0094772 A1 | 5/2005 | Harrison et al. | |
| 2005/0100137 A1 | 5/2005 | Beamon | |
| 2005/0119930 A1 | 6/2005 | Simon | |
| 2005/0131943 A1 | 6/2005 | Lewis et al. | |
| 2005/0144058 A1 | 6/2005 | Luo | |
| 2005/0171877 A1 * | 8/2005 | Weiss | 705/35 |
| 2005/0228725 A1 | 10/2005 | Rao et al. | |
| 2005/0288970 A1 * | 12/2005 | Holcom et al. | 705/4 |
| 2006/0015393 A1 | 1/2006 | Eisma et al. | |
| 2006/0031110 A1 * | 2/2006 | Benbassat et al. | 705/9 |
| 2006/0050854 A1 | 3/2006 | Beamon | |
| 2006/0053035 A1 | 3/2006 | Eisenberg | |
| 2006/0064305 A1 | 3/2006 | Alonso | |
| 2006/0064338 A1 | 3/2006 | Brotman et al. | |
| 2006/0090160 A1 | 4/2006 | Forsythe et al. | |
| 2006/0111957 A1 | 5/2006 | Carmi et al. | |
| 2006/0129691 A1 * | 6/2006 | Coffee et al. | 709/230 |
| 2006/0150077 A1 | 7/2006 | Sheldon et al. | |
| 2006/0182527 A1 * | 8/2006 | Ranstrom et al. | 414/140.3 |
| 2006/0206246 A1 * | 9/2006 | Walker | 701/16 |
| 2006/0213817 A1 | 9/2006 | Scott et al. | |
| 2006/0235739 A1 | 10/2006 | Levis et al. | |
| 2006/0241853 A1 * | 10/2006 | Gadler | 701/201 |
| 2006/0241855 A1 * | 10/2006 | Joe et al. | 701/202 |
| 2006/0244638 A1 * | 11/2006 | Lettau | 340/995.1 |
| 2007/0043464 A1 | 2/2007 | Zeif | |
| 2007/0078988 A1 * | 4/2007 | Miloushev et al. | 709/227 |
| 2007/0087756 A1 * | 4/2007 | Hoffberg | 455/450 |
| 2007/0129082 A1 * | 6/2007 | Thacher | 455/456.1 |
| 2007/0129880 A1 * | 6/2007 | Thacher | 701/202 |
| 2007/0174101 A1 | 7/2007 | Li et al. | |
| 2007/0179830 A1 | 8/2007 | Iknoian | |
| 2007/0211881 A1 | 9/2007 | Parker-Stephen | |
| 2007/0219842 A1 | 9/2007 | Bansal et al. | |
| 2007/0226090 A1 * | 9/2007 | Stratton | 705/30 |
| 2007/0251988 A1 | 11/2007 | Ahsan et al. | |
| 2007/0279214 A1 * | 12/2007 | Buehler | 340/521 |
| 2007/0282654 A1 | 12/2007 | Sarkar | |
| 2008/0016436 A1 | 1/2008 | Liu et al. | |
| 2008/0046803 A1 | 2/2008 | Beauchamp et al. | |
| 2008/0065456 A1 | 3/2008 | Labedz et al. | |
| 2008/0140597 A1 | 6/2008 | Satir et al. | |
| 2008/0162242 A1 | 7/2008 | Schneur et al. | |
| 2008/0172242 A1 | 7/2008 | Hyatt | |
| 2008/0263491 A1 * | 10/2008 | Foltz et al. | 716/8 |
| 2009/0020297 A1 | 1/2009 | Ingman et al. | |
| 2009/0024431 A1 | 1/2009 | Ingman et al. | |
| 2009/0024435 A1 | 1/2009 | Ingman et al. | |
| 2009/0024436 A1 | 1/2009 | Ingman et al. | |
| 2009/0024437 A1 | 1/2009 | Ingman et al. | |
| 2009/0024438 A1 | 1/2009 | Ingman et al. | |
| 2009/0024455 A1 | 1/2009 | Ingman et al. | |
| 2009/0024646 A1 | 1/2009 | Ingman et al. | |
| 2009/0024957 A1 | 1/2009 | Ingman et al. | |
| 2009/0024999 A1 | 1/2009 | Ingman et al. | |
| 2009/0177375 A1 * | 7/2009 | Jung et al. | 701/200 |
| 2012/0259670 A1 | 10/2012 | Ingman et al. | |
| 2012/0265577 A1 | 10/2012 | Ingman et al. | |
| 2013/0014062 A1 | 1/2013 | Ingman et al. | |

OTHER PUBLICATIONS

Xu et al. "Effective Heuristic Procedures for a Field Technician Scheduling Problem" (2001) Kluwer Academic Publishers, p. 495-509.*

U.S. Notice of Allowance dated Dec. 27, 2012 in U.S. Appl. No. 13/533,402.

"MDSI Mobile Data Solutions—Innovative and effective mobile workforce management and wireless connection", 1998, www.mdsi-advantex.com, pp. 1-31.

Lesaint et al., "Engineering Dynamic Scheduler for Work Manager", Jul. 1998, BT Technol J, 16(3):16-29.

Dimitri Golenko-Ginzburg, Zilla Simuany-Stern, Valdimir Kats, "A

Multilevel Decision-Making System with Multipleresources for Controlling Cotton Harvesting" Int. J. Production Economics 46-47 (1996) pp. 55-63.

Xu et al., Effective Heuristic Procedures for a Field Technician Scheduling Problem (2001) Kluwer Academic Publishers, p. 495-509.

Wennberg, J. et al., "Finding Equillibrium in U.S. Physician Supply," Health Affairs vol. 12, Issue:2 pp. 89-103 DOI: 10.1377/hlthaff. Dec. 2, 1989 Published: SUM 1993.

U.S. Office Action dated Feb. 2, 2010 in U.S. Appl. No. 11/778,867.
U.S. Office Action dated Aug. 23, 2010 in U.S. Appl. No. 11/778,919.
U.S. Office Action dated Dec. 9, 2010 in U.S. Appl. No. 11/778,919.
U.S. Office Action dated Aug. 25, 2011 in U.S. Appl. No. 11/778,919.
U.S. Notice of Allowance dated Dec. 19, 2011 in U.S. Appl. No. 11/778,919.
U.S. Office Action dated Oct. 13, 2010 in U.S. Appl. No. 11/778,953.
U.S. Office Action dated Mar. 24, 2011 in U.S. Appl. No. 11/778,953.
U.S. Notice of Allowance dated Sep. 27, 2012 in U.S. Appl. No. 11/778,953.
U.S. Office Action dated Apr. 15, 2010 in U.S. Appl. No. 11/778,962.
U.S. Office Action dated Aug. 26, 2010 in U.S. Appl. No. 11/778,962.
U.S. Office Action dated Jan. 25, 2011 in U.S. Appl. No. 11/778,962.
U.S. Office Action dated Feb. 21, 2012 in U.S. Appl. No. 11/778,962.
U.S. Notice of Allowance dated Jul. 26, 2012 in U.S. Appl. No. 11/778,962.
U.S. Office Action dated Apr. 1, 2010 in U.S. Appl. No. 11/778,999.
U.S. Office Action dated Sep. 24, 2010 in U.S. Appl. No. 11/778,999.
U.S. Notice of Allowance dated May 3, 2011 in U.S. Appl. No. 11/778,999.
U.S. Office Action dated Nov. 24, 2010 in U.S. Appl. No. 11/779,011.
U.S. Office Action dated May 11, 2011 in U.S. Appl. No. 11/779,011.
U.S. Office Action dated Apr. 25, 2012 in U.S. Appl. No. 11/779,011.
U.S. Office Action dated Oct. 11, 2012 in U.S. Appl. No. 11/779,011.
U.S. Office Action dated Feb. 4, 2011 in U.S. Appl. No. 11/779,027.
U.S. Notice of Allowance dated Aug. 4, 2011 in U.S. Appl. No. 11/779,027.
U.S. Office Action dated Nov. 16, 2010 in U.S. Appl. No. 11/779,054.
U.S. Notice of Allowance dated May 12, 2011 in U.S. Appl. No. 11/779,054.
U.S. Notice of Allowance dated Aug. 24, 2011 in U.S. Appl. No. 11/779,054.
U.S. Office Action dated Feb. 1, 2011 in U.S. Appl. No. 11/779,073.
U.S. Office Action dated Oct. 27, 2010 in U.S. Appl. No. 11/779,087.
U.S. Notice of Allowance dated Mar. 24, 2011 in U.S. Appl. No. 11/779,087.
U.S. Office Action dated Aug. 22, 2012 in U.S. Appl. No. 13/533,402.

\* cited by examiner

METHODS, SYSTEMS, AND COMPUTER-READABLE MEDIA FOR DETERMINING A PLURALITY OF TURFS FROM WHERE TO REALLOCATE A WORKFORCE TO A GIVEN TURF

CROSS-REFERENCE TO RELATED APPLICATIONS

The present application is a continuation of U.S. patent application Ser. No. 11/778,953, now U.S. Pat. No. 8,352,302, filed Jul. 17, 2007, titled "Methods, Systems, and Computer-Readable Media for Determining a Plurality of Turfs from Where to Reallocate a Workforce to a Given Turf," which is related to U.S. patent application Ser. No. 11/778,999, now U.S. Pat. No. 8,380,744, filed Jul. 17, 2007, titled "Methods, Systems, And Computer-Readable Media For Generating A Report Indicating Job Availability"; U.S. patent application Ser. No. 11/779,027, now U.S. Pat. No. 8,060,401, filed Jul. 17, 2007, titled "Methods, Systems, And Computer-Readable Media For Providing An Indication Of A Schedule Conflict"; U.S. patent application Ser. No. 11/779,054, now U.S. Pat. No. 8,069,072, filed Jul. 17, 2007, titled "Methods, Systems, And Computer-Readable Media For Providing An Indication Of Hightime"; U.S. patent application Ser. No. 11/779,087, now U.S. Pat. No. 8,249,905, filed Jul. 17, 2007, titled "Methods, Systems, And Computer-Readable Media For Providing Future Job Information"; U.S. patent application Ser. No. 11/778,867, now abandoned, filed Jul. 17, 2007, titled "Methods, Systems, And Computer-Readable Media For Providing Notification Of A Last Job Dispatch"; U.S. patent application Ser. No. 11/778,919, now U.S. Pat. No. 8,239,232, filed Jul. 17, 2007, titled "Methods, Systems, And Computer-Readable Media For Providing Commitments Information Relative To A Turf"; U.S. patent application Ser. No. 11/778,962, now U.S. Pat. No. 8,341,547, filed Jul. 17, 2007, titled "Methods, Systems, And Computer-Readable Media For Providing Contact Information At Turf Level"; U.S. patent application Ser. No. 11/779,011, filed Jul. 17, 2007, titled "Methods, Systems, And Computer-Readable Media For Providing A Ratio Of Tasks Per Technician"; and U.S. patent application Ser. No. 11/779,073, now abandoned, filed Jul. 17, 2007, titled "Methods, Systems, And Computer-Readable Media For Providing Workforce To Load Information"; each of which is hereby incorporated herein by reference.

TECHNICAL FIELD

This application relates generally to the field of load balancing. More specifically, the disclosure provided herein relates to the field of dynamic workforce reallocation.

BACKGROUND

Telecommunications networks may provide a number of services, such as plain old telephone service ("POTS"), digital subscriber line ("DSL"), and cable. A telecommunications network may be divided into a plurality of geographic areas known as turfs. Maintenance of the telecommunications network generally involves a proper reallocation of technicians across the turfs such that work orders can be timely filled. For example, when one turf experiences a high volume of work orders, it may be desirable to reallocate available technicians from another, preferably nearby, turf with a low volume of work orders to help with the high volume. The reallocation of technicians may be based on a number of factors, such as the location, skills, schedule, and availability of the technicians, as well as the priority of the work orders and the amount of time to complete the work orders.

A load balance supervisor ("LBS") may be assigned to coordinate the reallocation of technicians within a plurality of turfs (hereinafter referred to as an "assignment group"). In many instances, the LBS may not be familiar with the assignment group, which increases the difficulty of coordinating the reallocation of technicians across the assignment group. For example, the LBS may be assigned to an unfamiliar disaster area after a hurricane or a tornado. Without familiarity with the disaster area, the LBS may conventionally rely on turf maps and the advice of field supervisors to determine the most optimal locations from where to reallocate available technicians. A reliance on turf maps and manually contacting field supervisors for individual questions about the assignment group, however, may be inefficient and subject to human error.

SUMMARY

Embodiments of the disclosure presented herein include methods, systems, and computer-readable media for determining a plurality of turfs from where to reallocate a workforce to a given turf. According to one aspect, a method for determining a plurality of turfs from where to reallocate a workforce to a given turf is provided. According to the method, an indication of the given turf is received. Optimal turfs from where to reallocate technicians to the given turf are determined from a plurality of turfs. Visual cues for identifying at least a portion of the optimal turfs are generated.

According to another aspect, a system for determining a plurality of turfs from where to reallocate a workforce to a given turf is provided. The system includes a memory and a processor functionally coupled to the memory. The memory stores a program containing code for determining a plurality of turfs from where to reallocate a workforce to a given turf. The processor is responsive to computer-executable instructions contained in the program and operative to receive an indication of the given turf, determine which of a plurality of turfs are optimal turfs from where to reallocate technicians to the given turf and generate visual cues identifying at least a portion of the optimal turfs.

According to yet another aspect, a computer-readable medium having instructions stored thereon for execution by a processor to perform a method for determining a plurality of turfs from where to reallocate a workforce to a given turf is provided. According to the method, an indication of the given turf is received. Optimal turfs from where to reallocate technicians to the given turf are determined from a plurality of turfs. Visual cues for identifying at least a portion of the optimal turfs are generated.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

The following detailed description is directed to methods, systems, and computer-readable media for determining a plurality of turfs from where to reallocate a workforce to a given turf. In the following detailed description, references are made to the accompanying drawings that form a part hereof, and which are shown by way of illustration specific embodiments or examples.

As used herein, the terms "work order," "job," and "task" are used interchangeably. Although not so limited, embodiments described herein primarily refer to a "work order" as the maintenance and repair of a telecommunications network by a technician. However, it will be apparent to one of ordinary skill in the art that, in further embodiments, a "work order" may include any suitable service that involves the allocation and reallocation of personnel to perform the service.

Embodiments described herein provide a Next Generation Load Balance ("NGLB") tool for work force reallocation. According to exemplary embodiments, the NGLB tool has a graphical user interface ("GUI"), such as a GUI 400 of FIG. 5, containing an organized overview of work order and technician statuses within a plurality of turfs. The NGLB tool may be utilized by a load balance supervisor ("LBS") or other load balancing personnel to aid in the coordination of work force reallocation within the plurality of turfs. In one embodiment, the NGLB tool is provided to the LBS as a web-based application that can be accessed remotely via, for example, a web browser. In addition, the NGLB tool may be stored on a computing device used by the LBS to balance personnel.

Figure 2:
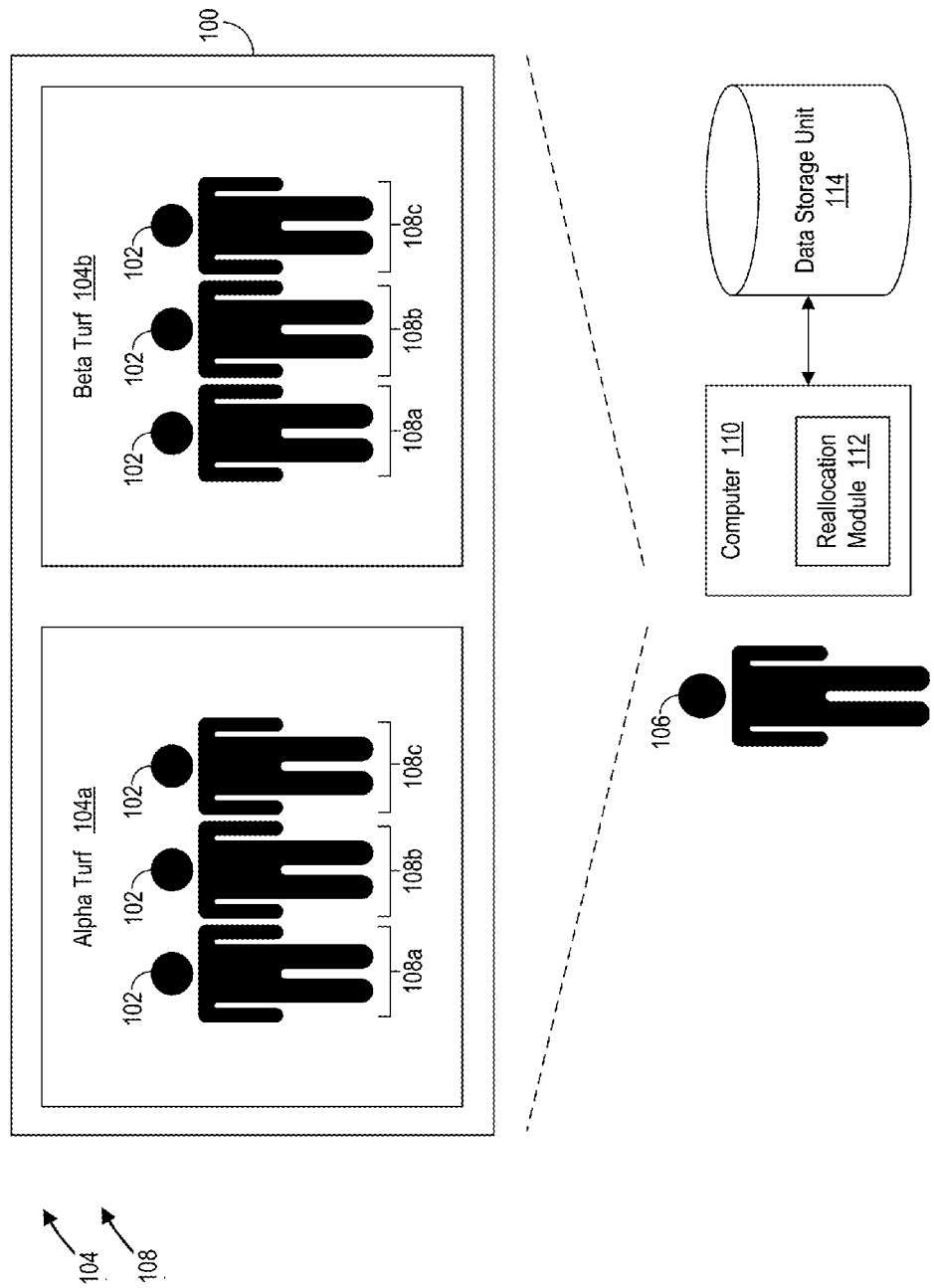
FIG. 2 is a high-level diagram illustrating an allocation of technicians for maintaining and repairing a telecommunications network, in accordance with exemplary embodiments.
Figure 3:
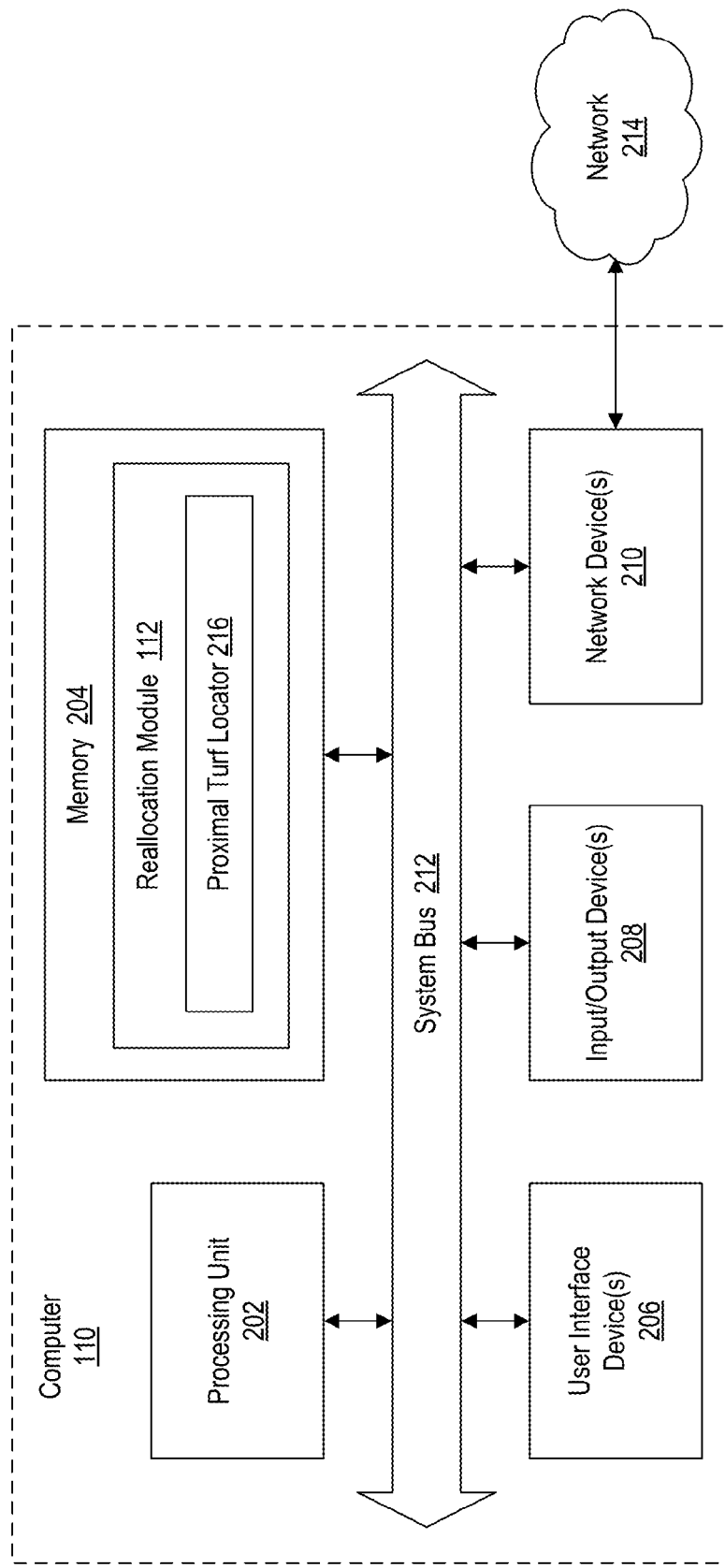
FIG. 3 is a block diagram illustrating a computer configured to provide a GUI that aids in the reallocation of the technicians across a plurality of turfs, in accordance with exemplary embodiments.
Figure 4:
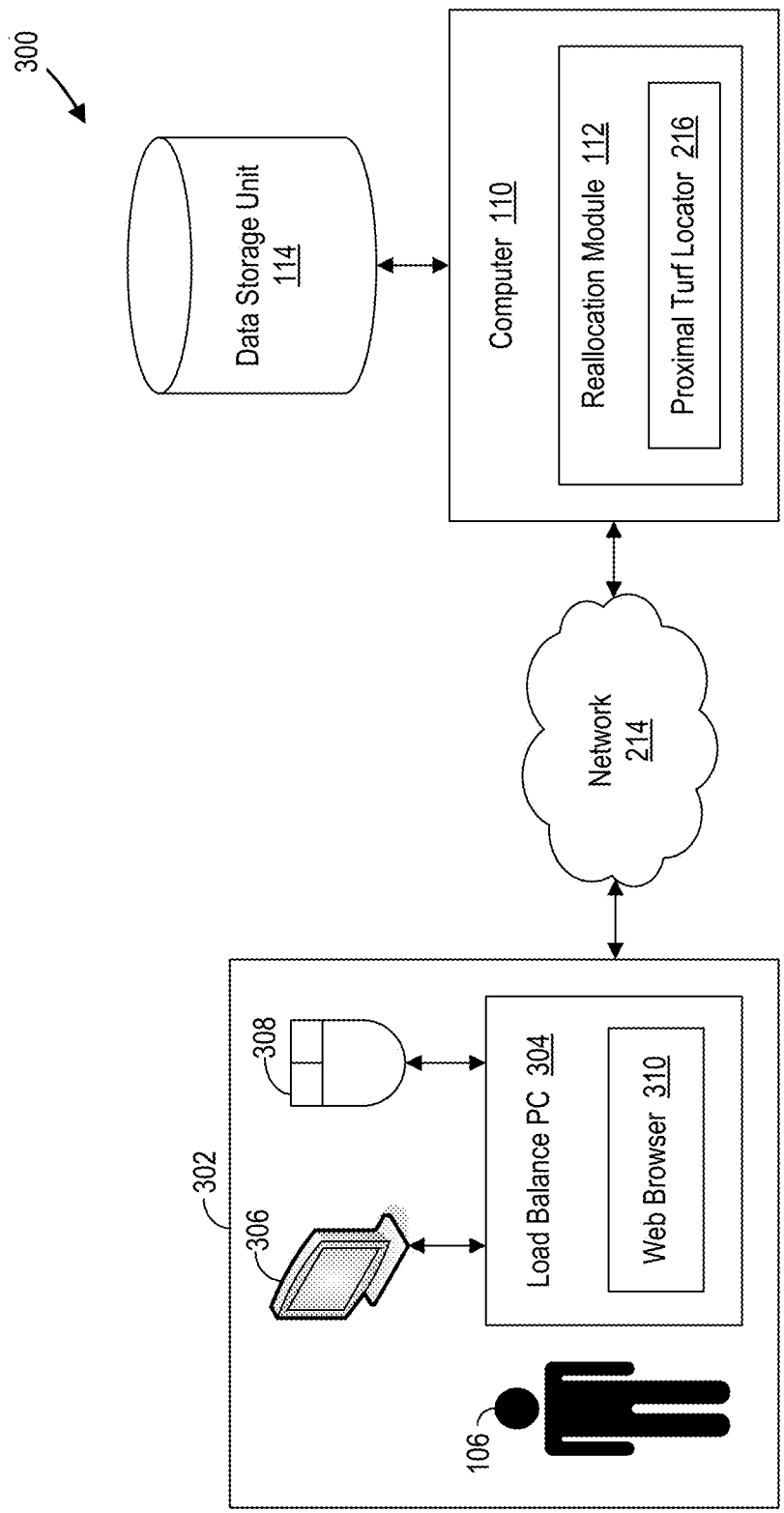
FIG. 4 is a block diagram of a workforce reallocation system, in accordance with exemplary embodiments.

According to further embodiments, the NGLB tool includes a proximal turf locator, such as the proximal turf locator 216 of FIGS. 3 and 4. The proximal turf locator 216 provides a plurality of turfs proximal to a given turf, according to one embodiment. The proximal turfs may be provided as a list or in other suitable presentations. Based on the proximal turfs provided by the proximal turf locator, the LBS or other load balancing personnel may determine one or more turfs from where to reallocate a workforce, such as the technicians 102 of FIG. 2, to the given turf. The proximal turfs may also be ranked according to any suitable criteria for determining an optimal location from where to reallocate the workforce. In one embodiment, the proximal turfs are ranked based on the distance between each of the plurality of turfs and the given turf as well as the ease with which a technician can move from each of the plurality of turfs to the given turf. The ease with which a technician can move between two turfs may be affected by any number of factors, such as the availability of roads between turfs and the traffic on the roads at a given time. The suitable criteria may be provided by, for example, the field supervisors or other experts of the turfs. The given turf may be selected by the LBS or other load balancing personnel.

Figure 1:
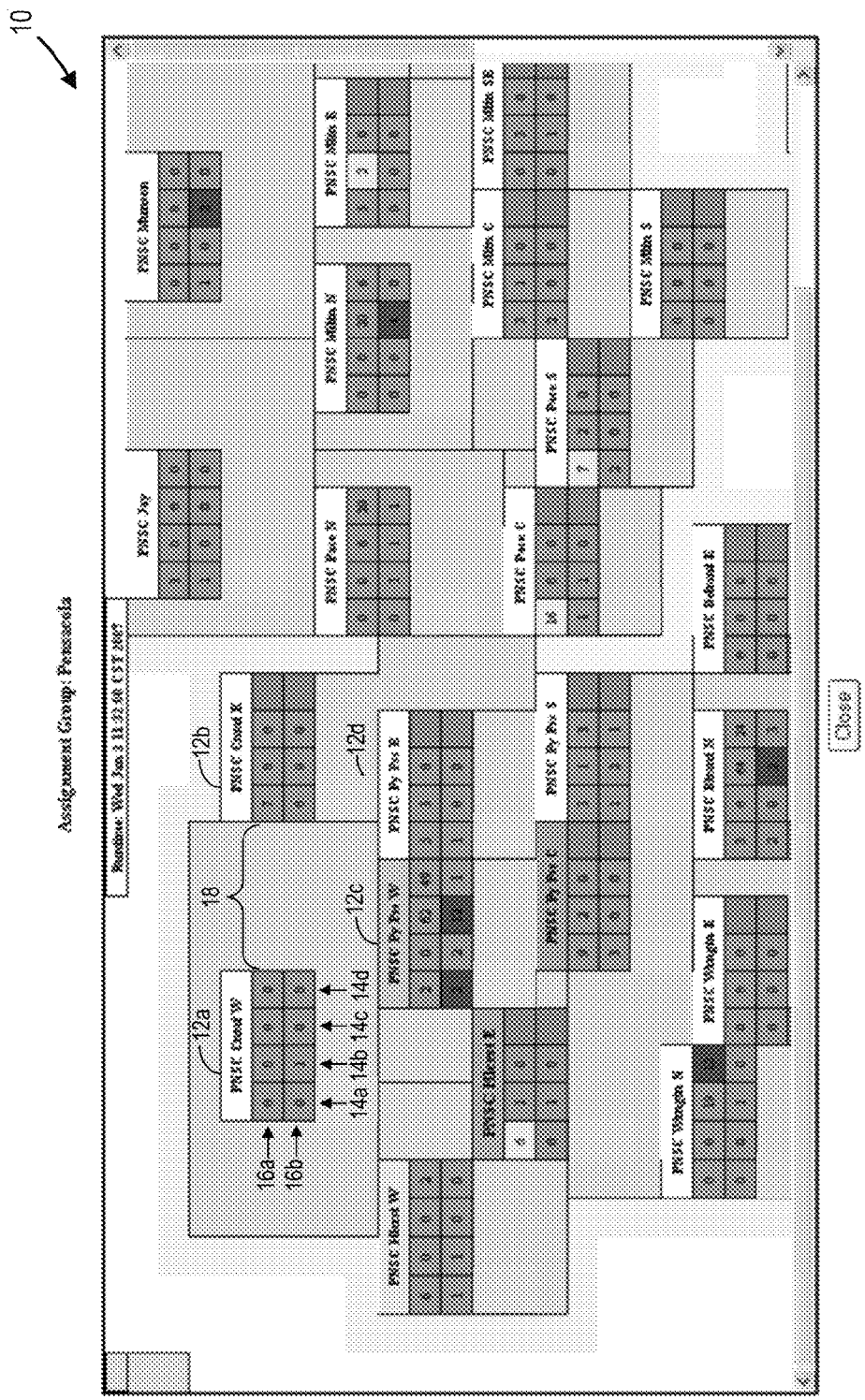
FIG. 1 is a diagram of an exemplary embodiment of a graphical user interface ("GUI") in a previous version.

Referring now to the drawings, it is to be understood that like numerals represent like elements through the several figures, and that not all components and/or steps described and illustrated with reference to the figures are required for all embodiments. FIG. 1 is an exemplary embodiment of the GUI 10 utilized in a previous version of the NGLB tool implemented by assignee of this application on or about April 2005. As illustrated in FIG. 1, the GUI 10 includes a plurality of turfs, such as turfs 12a, 12b, 12c, 12d. Each of the turfs, such as the turf 12a, includes four columns 14a, 14b, 14c, 14d. Each of the four columns 14a, 14b, 14c, 14d includes a first cell 16a and a second cell 16b. The first cell 16a includes job information and the second cell 16b includes technician information, according to one embodiment. The GUI 10 provides map presentation of the turfs 12a, 12b, 12c, 12d. The map presentation provides a visual mapping of physical distances between each of the plurality of the turfs 12a, 12b, 12c, 12d. In one example, the physical distance between the turf 12a and the turf 12b is a distance 18. In another example, the turf 12c and turf 12d are contiguous as indicated by the turf 12c being in contact with the turf 12d in the GUI 10.

FIGS. 2-9 as described below illustrate a current version of the NGLB tool. FIG. 2 is a high-level diagram illustrating an allocation of the technicians 102 for maintaining and repairing a telecommunications network 100, in accordance with exemplary embodiments. The telecommunications network 100 is maintained and repaired by a plurality of the technicians 102. As illustrated in FIG. 2, each of the technicians 102 is assigned to an Alpha turf 104a or a Beta turf 104b (collectively turfs 104) by a LBS 106 or other load balancing personnel, according to exemplary embodiments. Each turf 104 includes a plain old telephone service ("POTS") bucket 108a, a digital subscriber line ("DSL") bucket 108b, and a cable bucket 108c (collectively buckets 108), according to one embodiment. Each of the buckets 108 represents a discipline in which one or more of the technicians 102 may be assigned based on the skill set of the technician 102. In particular, the technician 102 in the POTS bucket 108a should have a skill set for completing POTS related work orders. The technician 102 in the DSL bucket 108b should have a skill set for completing DSL related work orders, and the technician 102 in the cable bucket 108c should have a skill set for completing cable related work orders. In one embodiment, one or more of the technicians 102 may include multiple skill sets for completing work orders under multiple buckets 108. The technicians 102 may be managed by one or more field supervisors (not shown). For example, the technicians 102 in each bucket 108 may be managed by a separate field supervisor.

For the sake of simplicity and without limitation, only two turfs 104a and 104b and three buckets 108a, 108b, and 108c are illustrated in FIG. 2. However, it will be apparent to those of ordinary skill in the art that the telecommunications network 100 may include any suitable number of turfs 104 and any suitable number and types of buckets 108, according to further embodiments.

The LBS 106 utilizes a computer 110 to aid in reallocating the plurality of technicians 102 across the turfs 104. The computer 110 includes a reallocation module 112, which enables the computer 110 to display a graphical user interface ("GUI"), such as the GUI 400 of FIG. 5, that provides the LBS 106 with an organized, visual presentation of the technicians 102, the turfs 104, and the buckets 108, according to one embodiment. In one example, if work orders in the Alpha turf 104a cannot be timely filled without additional technicians 102, the LBS 106 may view the GUI 400 to determine if the technicians 102 in the Beta turf 104b can be utilized. In a further example, if service orders in the POTS bucket 108a cannot be timely filled without additional technicians 102, the LBS 106 may view the GUI 400 to determine if the technicians 102 in the DSL bucket 108b or the cable bucket 108c are qualified to fill POTS work orders. In one embodiment, the computer 110 functions as a web server located remotely from the LBS 106 by executing a web server application, such as BEA WEBLOGIC SERVER from BEA SYSTEMS. In this embodiment, the LBS 106 may access the GUI 400 over a network, such as a network 214 of FIGS. 3 and 4, using, for example, a local web browser interface on a personal computer ("PC") or other computing device.

In one embodiment, the reallocation module 112 generates at least a portion of the GUI 400 based on data stored in a data storage unit 114. The data storage unit 114 may store any suitable data related to the technicians 102, such as the location, skills, schedule, and availability of the technicians 102. The data storage unit 114 may be a database. In one embodiment, the data storage unit 114 is an Integrated Dispatch System ("IDS"). The IDS is described in greater detail in U.S. Patent Application Publication No. 2004/0111311, entitled "Turfs and Skills for Multiple Technicians," to Ingman et al.; U.S. Patent Application Publication No. 2004/0111312, entitled "Validating Turfs for Work Orders," to Ingman et al.; U.S. Patent Application Publication No. 2004/0111313, entitled "Methods and Systems for Assigning Multiple Tasks," to Ingman et al.; and U.S. Patent Application Publication No. 2004/0111634, entitled "Security Permissions for an Integrated Dispatch System," to Ingman et al.

FIG. 3 and the following discussion are intended to provide a brief, general description of the computer 110 in which embodiments may be implemented. While embodiments will be described in the general context of program modules that execute in conjunction with an application program that runs on an operating system on a computer system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. The embodiments may also be practiced in distributed computing environments where tasks are performed by remote processing devices that are linked through a communications network. In a distributed computing environment, program modules may be located in both local and remote memory storage devices.

Figure 5:
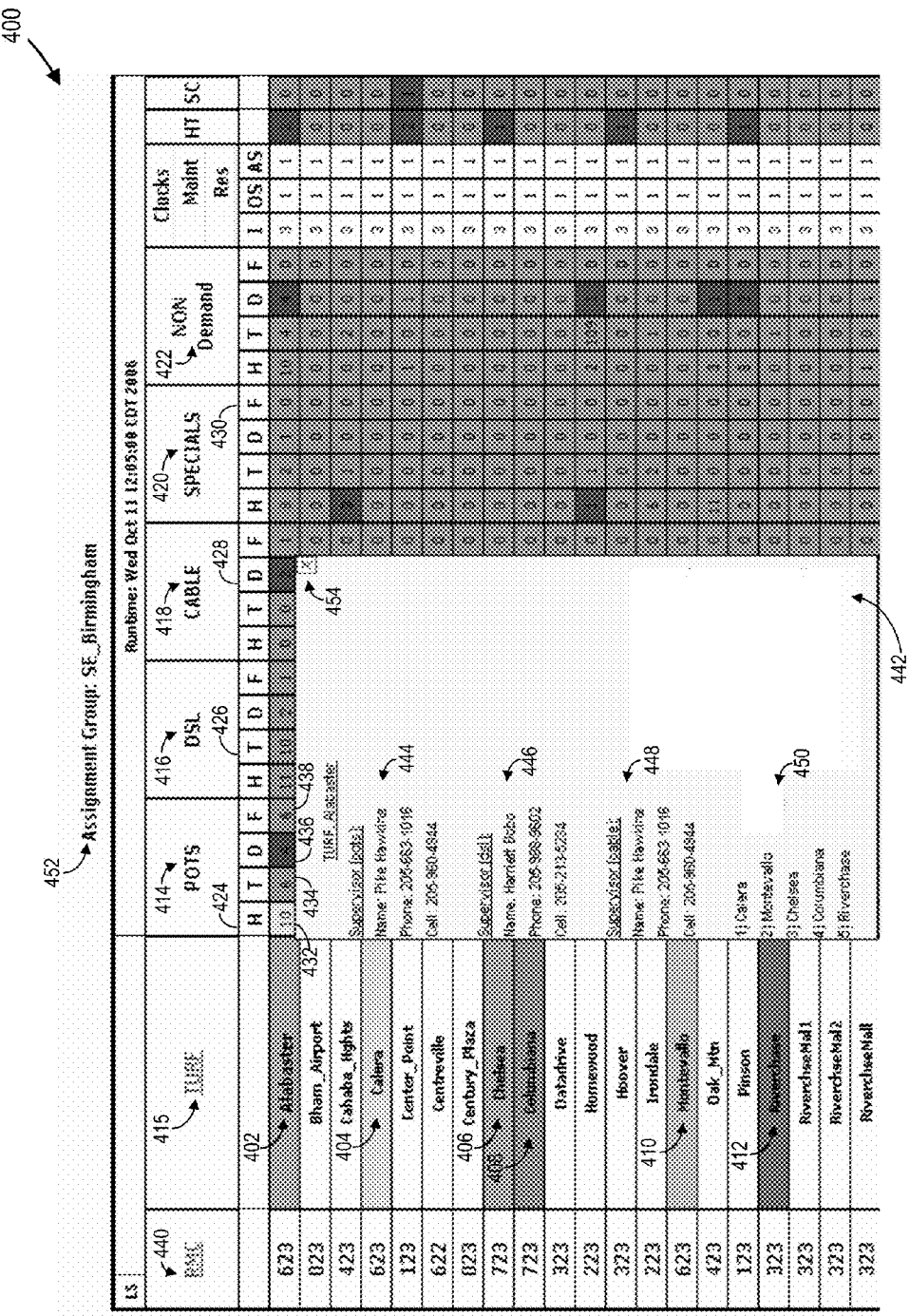
FIG. 5 is a diagram of a GUI, in accordance with exemplary embodiments
Figure 6:
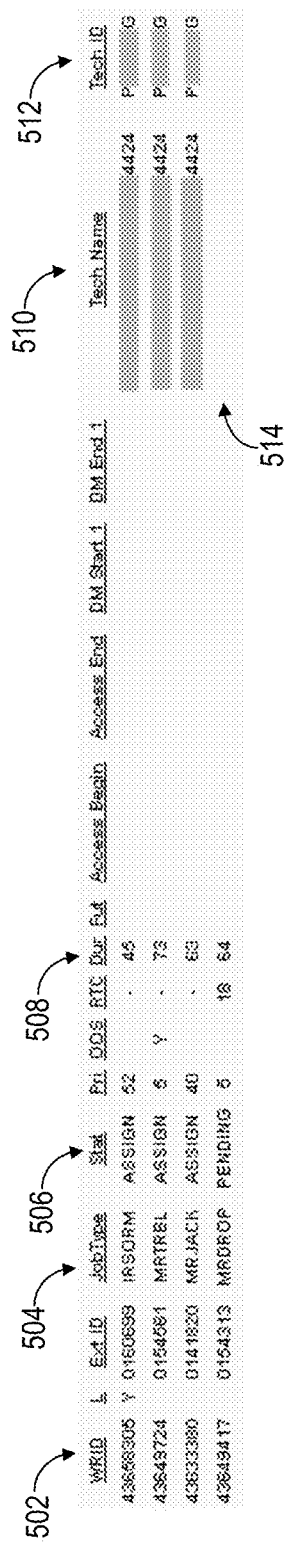
FIG. 6 is a diagram of a drop-down window in the GUI of FIG. 5, in accordance with exemplary embodiments.
Figure 7:
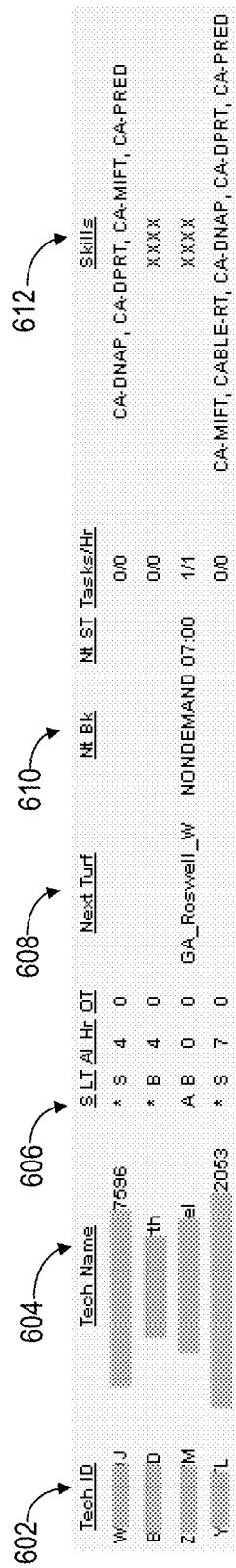
FIG. 7 is a diagram of another drop-down window in the GUI of FIG. 5, in accordance with exemplary embodiments.
Figure 8:
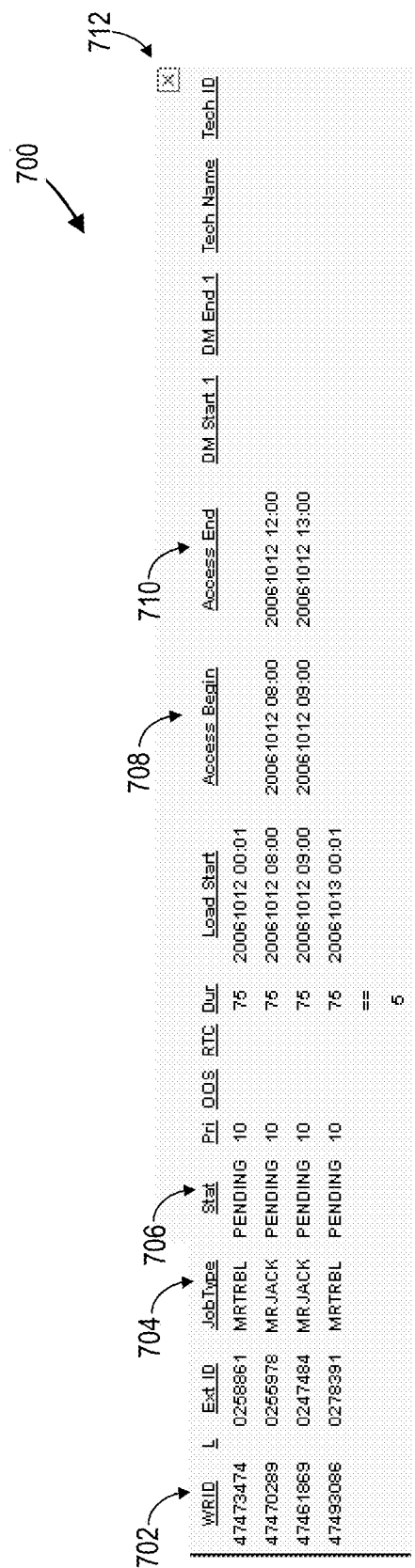
FIG. 8 is a diagram of another drop-down window in the GUI of FIG. 5, in accordance with exemplary embodiments.

FIG. 3 is a block diagram illustrating the computer 110 configured to provide a GUI, such as the GUI 400 of FIG. 5, that aids in the reallocation of the technicians 102 across the turfs 104, in accordance with exemplary embodiments. The computer 110 includes a processing unit 202, a memory 204, one or more user interface devices 206, one or more input/output ("I/O") devices 208, and one or more network devices 210, each of which is operatively connected to a system bus 212. The bus 212 enables bi-directional communication between the processing unit 202, the memory 204, the user interface devices 206, the I/O devices 208, and the network devices 210.

The processing unit 202 may be a standard central processor that performs arithmetic and logical operations, a more specific purpose programmable logic controller ("PLC"), a programmable gate array, or other type of processor known to those skilled in the art and suitable for controlling the operation of the server computer. Processing units are well-known in the art, and therefore not described in further detail herein.

The memory 204 communicates with the processing unit 202 via the system bus 212. In one embodiment, the memory 204 is operatively connected to a memory controller (not shown) that enables communication with the processing unit 202 via the system bus 212. According to exemplary embodiments, the memory 204 includes the reallocation module 112. In one embodiment, the reallocation module 112 is embodied in computer-readable media containing instructions that, when executed by the processing unit 202, generates a GUI, such as the GUI 400 of FIG. 5, containing information related to the reallocation of the technicians 102 across a plurality of the turfs 104, as described in greater detail below. Exemplary information related to the reallocation across a plurality of the turfs 104 includes, but is not limited to, the physical proximity between the technicians 102, the availability of the technicians 102, the physical proximity between the turfs 104, the existing load on each of the turfs 104, and the anticipated load on each of the turfs 104. According to further embodiments, the reallocation module 112 may be embodied in hardware, software, firmware, or any combination thereof.

As illustrated in FIG. 3, the reallocation module 112 includes the proximal turf locator 216. In one embodiment, the proximal turf locator 216 is embodied in computer-readable media containing instructions that, when executed by the processing unit 202, provides a plurality of turfs proximal to a given turf. The proximal turfs may be provided as a list or in other suitable presentations. Based on the proximal turfs provided by the proximal turf locator 216, the LBS 106 or other load balancing personnel may determine one or more turfs from where to reallocate technicians to the given turf. The proximal turfs may also be ranked according to any suitable criteria for determining an optimal location from where to reallocate the technicians 102. In one embodiment, the proximal turfs are ranked based on the distance between each of the plurality of turfs and the given turf as well as the ease with which the technician 102 can move from each of the plurality of turfs to the given turf. The ease with which the technician 102 can move between two turfs may be affected by any number of factors, such as the availability of roads between turfs and the traffic on the roads at a given time. The given turf may be selected by the LBS 106.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 110.

The user interface devices 206 may include one or more devices with which a user accesses the computer 110. The user interface devices 206 may include, but are not limited to, computers, servers, personal digital assistants, cellular phones, or any suitable computing devices. In one embodiment, the computer 110 functions as a web server located remotely from the LBS 106 by executing a web server application, such as BEA WEBLOGIC SERVER from BEA SYSTEMS. By enabling the computer 110 to function as a web server, the LBS 106 may access the GUI 400 generated by the computer 110 over a network, such as the network 214, using, for example, a local web browser interface on a PC or other computing device.

According to exemplary embodiments, the I/O devices 208 enable a user to interface with the reallocation module 112. In one embodiment, the I/O devices 208 are operatively connected to an I/O controller (not shown) that enables communication with the processing unit 202 via the system bus 212. The I/O devices 208 may include one or more input devices, such as, but not limited to, a keyboard, a mouse, and an electronic stylus. Further, the I/O devices 208 may include one or more output devices, such as, but not limited to, a display screen and a printer.

The network devices 210 enable the computer 110 to communicate with other networks or remote systems via the network 214. Examples of the network devices 210 may include, but are not limited to, a modem, a radio frequency ("RF") or infrared ("IR") transceiver, a telephonic interface, a bridge, a router, or a network card. The network 214 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 214 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

FIG. 4 is a block diagram of a workforce reallocation system 300, in accordance with exemplary embodiments. The workforce reallocation system 300 includes the computer 110, a network dispatch center ("NDC") 302, and the data storage unit 114, each of which is operatively connected to the network 214. The NDC 302 includes a load balance PC 304, which is utilized by the LBS 106, according to one embodiment. In further embodiments, the NDC 302 may include any suitable number of load balance PCs 304 to be utilized by any suitable number of LBSs 106. The data storage unit 114 may store any suitable data regarding the technicians 102, such as their location, skills, schedule, and availability. In one embodiment, the reallocation module 112 retrieves data from the data storage unit 114 to generate a GUI, such as the GUI 400 of FIG. 5. The data storage unit 114 may be a database. In one embodiment, the data storage unit 114 is an IDS.

The load balance PC 304 includes a display 306 and a mouse 308, according to one embodiment. In further embodiments, the load balance PC 304 may include any suitable input/output devices 208. It will be apparent to one having ordinary skill in the art that the load balance PC 304 may be substituted with any suitable computing device, such as a personal digital assistant or a cellular phone. The display 306 may be configured to display the GUI 400 and the plurality of turfs 104 provided by the proximal turf locator 216.

In exemplary embodiments, the load balance PC 304 includes a web browser 310, such as INTERNET EXPLORER from MICROSOFT CORPORATION, for accessing the GUI 400 and for facilitating communications between the LBS 106 and the computer 110. Using the web browser 310, the LBS 106 may access the GUI 400 by inputting a Uniform Resource Locator ("URL") into the web browser 310. The load balance PC 304 may communicate with the computer 110 via Hypertext Transfer Protocol ("HTTP"). As previously described, the computer 110 may function as a web server. In one embodiment, access to the GUI 400 by the load balance PC 304 may be restricted by a login screen requiring, for example, a login identification and a password. In further embodiments, communications between the load balance PC 304 and the computer 110 may be encrypted by any suitable encryption mechanism.

In exemplary embodiments, the computer 110 may communicate with the data storage unit 114 via a Java Database Connectivity ("JDBC") application program interface ("API"). In one embodiment, the computer 110 retrieves data from the data storage unit 114 at regular intervals, such as every two to five minutes. In further embodiments, the computer 110 retrieves data from the data storage unit 114 when requested by the LBS 106. In other embodiments, the reallocation module 112 may be stored on the load balance PC 304 such that the GUI 400 is accessed from the load balance PC 304 and such that the load balance PC 304 communicates with and retrieves data from the data storage unit 114.

FIG. 5 is an exemplary embodiment of the GUI 400. In one embodiment, the GUI 400 is generated by the reallocation module 112 of the computer 110. The LBS 106 may view the GUI 400 on the display 306 via the web browser 310 associated with the load balance PC 304. In one embodiment, various portions of the GUI 400 are accessible by an input device, such as the mouse 308. It should be appreciated that the GUI 400 illustrated in FIG. 5 is only an exemplary embodiment. It will be apparent to one having ordinary skill in the art that in other embodiments, the GUI 400 may be displayed differently (e.g., as a map presentation), may omit certain fields, or may include other fields.

According to exemplary embodiments, the GUI 400 includes a plurality of turfs, such as an Alabaster turf 402, a Calera turf 404, a Chelsea turf 406, a Columbiana turf 408, a Montevallo turf 410, and a Riverchase turf 412 in a Turf column 415. The GUI 400 may further include a plurality of buckets: a POTS bucket 414, a DSL bucket 416, a Cable bucket 418, a Specials bucket 420, and a Non-Demand ("ND") bucket 422. According to exemplary embodiments, each of the buckets 414, 416, 418, 420, 422 includes four columns: an Hours column 424, a Tickets column 426, a Dispatched Technicians (hereinafter referred to as Dispatches) column 428, and a Future Tickets (hereinafter referred to as Futures) column 430. Each of a plurality of cells 432, 434, 436, 438 may be associated with a column, a bucket, and a turf. For example, the cell 432 is associated with the Hours column 424, the POTS bucket 414, and the Alabaster turf 402.

A turf, such as the Alabaster turf 402, may refer to any suitable geographic area. For example, the Alabaster turf 402 refers to the city of Alabaster, Ala. As illustrated in FIG. 5, the GUI 400 displays the turfs, such as the turfs 402, 404, 406, 408, 410, 412, contained in a southeast Birmingham assignment group ("AG") 452. In one embodiment, the NDC 302 includes a plurality of load balance PCs, such as the PC 304, where each load balance PC corresponds to a different AG, such as the AG 452.

According to exemplary embodiments, the POTS bucket 414 contains information related to POTS related work orders. The DSL bucket 416 contains information related to DSL related work orders. The Cable bucket 418 contains information related to cable related work orders. The Specials bucket 420 contains information related to special circuit related work orders, such as Digital Signal 1 ("DS1") and Digital Signal 3 ("DS3"). The ND bucket 422 is a catch-all bucket containing information related to work orders not categorized in the POTS bucket 414, the DSL bucket 416, the Cable bucket 418, or the specials bucket 420.

The Hours column 424 indicates the number of hours of pending and assigned work orders in each turf 402, 404, 406, 408, 410, 412. For example, the cell 432 indicates that there are ten hours of pending and assigned POTS related work orders in the Alabaster turf 402. As used herein, an assigned work order is defined as a work order that is assigned to a technician, such as the technician 102, and a pending work order is defined as a work order that is not assigned to a technician 102 and is to be completed within the current business day.

In one embodiment, each cell, such as the cell 432, in the Hours column 424 may be accessed by an input device, such as the mouse 308. For example, the Hours column 424 may be accessed by hovering a mouse cursor over the cell 432 or by clicking the cell using the mouse 308. In response to accessing a cell, such as the cell 432, in the Hours column 424, the GUI 400 may display a window, such as a drop-down window 500 illustrated in FIG. 6, according to exemplary embodiments. The drop-down window 500 may include a job ID column 502, a job type column 504, a status column 506, a job duration column 508, a technician name column 510, and a technician ID column 512. According to exemplary embodiments, the job ID column 502 identifies a particular job. The job type column 504 identifies the type of work to be done on that job. The status column 506 indicates whether the job has been assigned or is pending. The job duration column 508 indicates the anticipated duration of the job. The technician name column 510 and the technician ID column 512 identify a particular technician, such as the technician 102, assigned to the job. The technician name column 510 and the technician ID column 512 may be blank for pending jobs, as shown at 514. Although not shown in FIG. 6, the drop-down window 500 may include a terminate button with which to close the drop-down window 500.

Referring again to FIG. 5, the Tickets column 426 may indicate the number of tickets (i.e., work orders) corresponding to the number of hours shown in the Hours column 424 of one of the buckets 414, 416, 418, 420, 422. For example, the cell 434 indicates that six tickets are assigned and pending. The six tickets indicated in the cell 434 correspond to the ten hours of work indicated in cell 432. In one embodiment, each cell, such as the cell 434, in the Tickets column 426 may be accessed by an input device, such as the mouse 308. For example, the Tickets column 426 may be accessed by hovering a mouse cursor over the cell 434 or by clicking the cell using the mouse 308. In response to accessing a cell, such as the cell 434, in the Tickets column 426, GUI 400 may display a window (not shown), such as a drop-down window, according to one embodiment. The drop-down window may provide additional information about the pending and assigned tickets, such as the type of work to be performed in each ticket.

The Dispatches column 428 indicates the number of the technicians 102 dispatched. For example, the cell 436 indicates that four technicians 102 are dispatched to perform POTS related work orders in the Alabaster turf 402. In one embodiment, each cell, such as the cell 436, in the Dispatches column 428 may be accessed by an input device, such as the mouse 308. For example, the Dispatches column 428 may be accessed by hovering a mouse cursor over the cell 436 or by clicking the cell using the mouse 308. In response to accessing a cell, such as the cell 436, in the Dispatches column 428, the GUI 400 may display a window, such as a drop-down window 600 illustrated in FIG. 7, according to exemplary embodiments. The drop-down window 600 includes a technician ID column 602, a technician name column 604, a technician status column 606, a next turf column 608, a next bucket column 610, and a skills column 612. According to exemplary embodiments, the technician ID column 602 and the technician name column 604 identify a particular technician, such as the technician 102, that has been dispatched. The technician status column 606 indicates whether the identified technician 102 is on his/her last dispatch (indicated by a "*" in the technician status column 606) or is assigned to another job (indicated by an "A" in the technician status column 606). The next turf column 608 and the next bucket column 610 may identify the turf and bucket, respectively, for the next job if the identified technician 102 has been assigned to another job (i.e., the technician status column 606 is "A"). The skills column 612 identifies one or more skills currently assigned to the identified technician 102. Although not shown in FIG. 7, the drop-down window 600 may include a terminate button with which to close the drop-down window 600.

Referring again to FIG. 5, the Futures column 430 indicates the number of future jobs to be completed, according to exemplary embodiments. For example, the cell 438 indicates that six jobs are to be completed in the future. In one embodiment, a future job is a job to be completed between one and three days. In further embodiments, a future job may be a job to be completed within any suitable time frame beyond the time frame for a pending job, as previously described. In one embodiment, each cell, such as the cell 438, in the Futures column 430 may be accessed by an input device, such as the mouse 308. For example, the Futures column 430 may be accessed by hovering a mouse cursor over the cell or by clicking the cell 438 using the mouse 308. In response to accessing a cell, such as the cell 438, in the Futures column 430, the GUI 400 may display a window, such as a drop-down window 700 illustrated in FIG. 8, according to exemplary embodiments. The drop-down window 700 may include a job ID column 702, a job type column 704, a job status column 706, an access begin column 708, and an access end column 710. According to exemplary embodiments, the job ID column 702 identifies a particular future job. The job type column 704 identifies the type of work to be done on the identified future job. The job status column 706 indicates whether the identified future job is pending or assigned. The access begin column 708 and the access end column 710 indicate the beginning and the end, respectively, of a time frame with which a technician, such as the technician 102, is scheduled to perform the identified future job. The drop-down window 700 further includes a terminate button 712 with which to close the drop-down window 700.

The GUI 400 further includes a Regional Maintenance Center ("RMC") column 440, which indicates the RMC number designated to a particular turf, according to exemplary embodiments. In one embodiment, each RMC number listed under the RMC column 440 may be accessible by an input device, such as the mouse 308. For example, a RMC number may be accessed by hovering a mouse cursor over the RMC number or by clicking the RMC number using the mouse 308.

In response to accessing the RMC number, the GUI 400 may display a window, such as a drop-down window, according to one embodiment. The window may include information related to each of the buckets 414, 416, 418, 420, 422, such as hours, tickets, and dispatches.

Each of the turfs, such as the turfs 402, 404, 406, 408, 410, 412, in the GUI 400 may be accessed by an input device, such as the mouse 308. FIG. 5 illustrates that the Alabaster turf 402 has been selected, for example, by hovering a mouse cursor over the turf or by clicking the turf using the mouse 308. In response to selecting the Alabaster turf 402, the GUI 400 may display a window, such as a drop-down window 442, according to exemplary embodiments. The drop-down window 442 identifies contact information 444 for a POTS field supervisor, contact information 446 for a DSL field supervisor, and contact information 448 for a cable supervisor, according to one embodiment. As their names suggest, the POTS field supervisor supervises POTS related work, the DSL field supervisor supervises DSL related work, and the cable supervisor supervises cable related work. The contact information 444, 446, 448 corresponds to field supervisors of the Alabaster turf 402. In one embodiment, the contact information 444, 446, 448 includes the field supervisor's name, a work phone number, and a cellular phone number. In further embodiments, the contact information 444, 446, 448 includes any suitable information for contacting the field supervisors. Although not illustrated in FIG. 5, the drop-down window 442 may further identify contact information for a Specials field supervisor who supervises specials related work, a ND field supervisor who supervises non-demand related work, and other field supervisors. The drop-down window 442 includes a terminate button 454 with which to close the drop-down window 442.

The drop-down window 442 further identifies a list 450 of turfs, such as five turfs, in ranking order from one to five, according to one embodiment: (1) the Calera turf 404; (2) the Montevallo turf 410; (3) the Chelsea turf 406; (4) the Columbiana turf 408; and (5) the Riverchase turf 412. In further embodiments, the drop-down window 442 may include a list containing any suitable number of turfs. The list 450 provides a plurality of proximal turfs with respect to the Alabaster turf 402, which was selected in the GUI 400. The list 450 may be determined and ranked according to any suitable criteria, such as the distance between each of the listed turfs 404, 406, 408, 410, 412 and the Alabaster turf 402 as well as the ease with which a technician, such as the technician 102, can move from each of the listed turfs 404, 406, 408, 410, 412 to the Alabaster turf 402. The ease with which the technician 102 can move between two turfs may be affected by any number of factors, such as the availability of roads between turfs and the traffic on the roads at a given time. The suitable criteria may be provided by, for example, the field supervisors or other experts of the turfs. The given turf may be selected by the LBS 106 or other load balancing personnel.

The list 450 may be determined by the proximal turf locator 216. As previously described, the proximal turf locator 216 may be embodied in computer-readable media containing instructions that, when executed by the processing unit 202, determines a plurality of turfs from where to reallocate a workforce to a given turf. An exemplary method for determining a plurality of turfs from where to reallocate a workforce to a given turf is described in greater detail below with respect to FIG. 9.

The list 450 provides the LBS 106 with a concise and organized summary of the proximal turfs, such as the turfs 404, 406, 408, 410, 412 with respect to a turf selected from the Turf column 415 by the LBS 106, such as the Alabaster turf 402. As illustrated in FIG. 5, the drop-down window 442 may be displayed in the GUI 400 in response to the LBS 106 selecting the Alabaster turf 402 in the GUI 400. In one embodiment, the list 450 is arranged in an order such that the most optimal location from where to reallocate the technicians 102 is ranked first, the second most optimal location from where to reallocate the technicians 102 is ranked second, and so forth. For example, since the Calera turf 404 is ranked first in the list 450, the Calera turf 404 was determined by the proximal turf locator 216 to be the most optimal location from where to reallocate the technicians 102. Additionally, since the Montevallo turf 410 is ranked second in the list 450, the Montevallo turf 410 was determined by the proximal turf locator 216 to be the second most optimal location where to reallocate the technicians 102. It follows then that the Chelsea turf 406 is the third most optimal location, the Columbiana turf 408 is the fourth most optimal location, and the Riverchase turf 412 is the fifth most optimal location. In further embodiments, the list 450 may arrange the turfs in any suitable order.

In response to the LBS 106 selecting one of the turfs from the Turf column 415, such as the Alabaster turf 402, the GUI 400 may provide visual cues of the turfs proximal to the selected turf. The visual cues may be included in the GUI 400 to replace the list 450 or to supplement the list 450. Although not so limited, the visual cues are presented in the GUI 400 as highlights or shades associated with the turfs, according to one embodiment. In further embodiments, the visual cues not only indicate the proximal turfs, but also rank the turfs such that the LBS 106 can easily determine the most optimal turfs from where to reallocate technicians 102. For example, as illustrated in FIG. 5, the Calera turf 404, the Chelsea turf 406, the Columbiana turf 408, the Montevallo turf 410, and the Riverchase turf 412 are highlighted when the Alabaster turf 402 is selected. The turfs 404, 406, 408, 410, 412 may be shaded such that the turf with the lightest tone is the most optimal turf of the shaded turfs from where to reallocate the technicians 102, and the turf with the darkest tone may be the least optimal turf of the shaded turfs from where to reallocate the technicians. Thus, consistent with the list 450, the Calera turf 404 may be shaded the lightest to indicate that the Calera turf is the most optimal turf from where to reallocate the technicians 102 to the Alabaster turf 402. The shading then becomes darker progressing from the Calera turf 404 to the Montevallo turf 410, then to the Chelsea turf 406, then to the Columbiana turf 408, and then to the Riverchase turf 412 such that out of the five proximal turfs, the Riverchase turf 412 is the least optimal turf from which to allocate the technicians 102 to the Alabaster turf 402.

In further embodiments, the visual cues may be presented in other suitable formats. In one example, the visual cues may utilize a coloring scheme to identify proximal turfs and to rank the proximal turfs. For example, the color green may be associated with the most proximal turf and the color red may be associated with the least proximal turf, while other colors may be associated with turfs to indicate in-between levels of proximity. In another example, the visual cues may utilize different font sizes, colors, and formats, such as identifying proximal turfs with a bold font. The visual cues may be enhanced with audio or other multimedia, according to exemplary embodiments.

Figure 9:
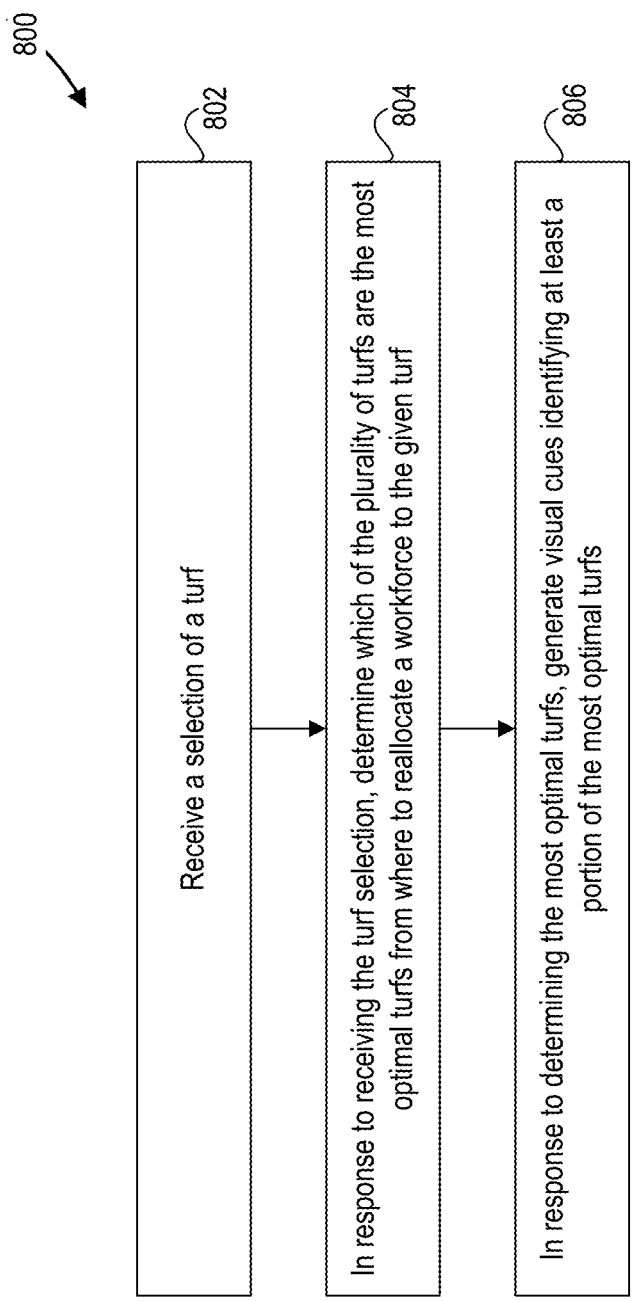
FIG. 9 is a flow diagram illustrating a method for determining a plurality of turfs from where to reallocate a workforce to a given turf, in accordance with exemplary embodiments.

FIG. 9 is a flow diagram illustrating a method 800 for determining a plurality of turfs from where to reallocate a workforce to a given turf, in accordance with exemplary embodiments. The given turf may be selected by the LBS 106 via a GUI, such as the GUI 400. According to the method 800, the proximal turf locator 216 receives (at 802) a selection of a turf from the GUI 400. For example, the LBS 106 or other load balancing personnel may use the load balance PC 304 to access the GUI 400 and select the Alabaster turf 402 by hovering over or clicking on the Alabaster turf 402 in the Turf column 415. In response to the received turf selection, the proximal turf locator 216 determines (at 804) which of a plurality of the turfs are the most optimal turfs from where to reallocate the technicians 102 to the given turf 402. The most optimal turfs may be determined based on one or more suitable criteria, such as the distance between each of the plurality of turfs and the given turf 402 as well as the ease with which a technician, such as the technician 102, can move from each of the plurality of turfs to the given turf 402f. The ease with which the technician 102 can move between two turfs may be affected by any number of factors, such as the availability of roads between turfs and the traffic on the roads at a given time. The suitable criteria may be provided by, for example, the field supervisors or other experts of the turfs.

In response to determining the most optimal turfs, the proximal turf locator 216 generates (at 806) visual cues identifying at least a portion of the most optimal turfs based on the given turf 402. The visual cues provide a concise and organized presentation that the LBS 106 can use to easily identify the optimal turfs. In one embodiment, the visual cues are provided in a list, such as the list 450. In further embodiments, the visual cues are provided by highlighting or shading selected portions of a GUI, such as the GUI 400.

Although the subject matter presented herein has been described in conjunction with one or more particular embodiments and implementations, it is to be understood that the embodiments defined in the appended claims are not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

What is claimed is:

1. A method for determining a plurality of turfs from where to reallocate a workforce to a given turf, the method comprising:
    displaying, by a computer having a processor and a memory, a graphical user interface, the graphical user interface displaying a plurality of turfs in a map presentation that provides a visual mapping of physical distances between each of the plurality of the turfs, wherein each of the plurality of turfs comprises a geographic area, and wherein each of a plurality of telecommunications technicians are assigned to one of the plurality of turfs;
    receiving, via the computer, a selection of the given turf from the plurality of turfs through the graphical user interface;
    upon receiving the selection of the given turf from the plurality of turfs,
        determining, by the computer, other turfs of the plurality of turfs that are optimal turfs from where to reallocate telecommunications technicians to the given turf, and
        displaying, by the computer via the graphical user interface, contact information of a field supervisor associated with the given turf;
    determining, by the computer, a level of optimality for each of the optimal turfs with respect to reallocating the telecommunications technicians from each of the optimal turfs to the given turf; and
    generating, by the computer, visual cues in the graphical user interface highlighting each of the optimal turfs associated with a different shade of highlighting corresponding to the level of optimality associated with each of the optimal turfs.

2. The method of claim 1, wherein determining the other turfs of the plurality of turfs that are the optimal turfs comprises determining, by the computer, the other turfs of the plurality of turfs that are the optimal turfs based on a distance between each of the other turfs of the plurality of turfs and the given turf.

3. The method of claim 1, wherein determining the other turfs of the plurality of turfs that are the optimal turfs comprises determining, by the computer, the other turfs of the plurality of turfs that are the optimal turfs based on an ease with which a telecommunications technician is reallocated from each of the other turfs of the plurality of turfs to the given turf.

4. The method of claim 3, wherein the ease with which a telecommunications technician is reallocated comprises an availability of roads between each of the other turfs of the plurality of turfs and the given turf.

5. The method of claim 3, wherein the ease with which a telecommunications technician is reallocated comprises an amount of traffic on roads between each of the other turfs of the plurality of turfs and the given turf.

6. The method of claim 1, wherein the contact information of the field supervisor comprises a name of the field supervisor, a work phone number of the field supervisor, and a cellular phone number of the field supervisor.

7. The method of claim 1, wherein the contact information of the field supervisor comprises a discipline associated with a skill set of the field supervisor.

8. A system for determining a plurality of turfs from where to reallocate a workforce to a given turf, comprising:
    a processor; and
    a memory for storing a program containing code that, when executed by the processor, cause the processor to perform operations comprising
        displaying a graphical user interface, the graphical user interface displaying a plurality of turfs in a map presentation that provides a visual mapping of physical distances between each of the plurality of the turfs, wherein each of the plurality of turfs comprises a geographic area, and wherein each of a plurality of telecommunications technicians are assigned to one of the plurality of turfs,
        receiving a selection of the given turf from the plurality of turfs through the graphical user interface,
        upon receiving the selection of the given turf from the plurality of turfs,
            determining other turfs of the plurality of turfs that are optimal turfs from where to reallocate telecommunications technicians to the given turf, and
            displaying, via the graphical user interface, contact information of a field supervisor associated with the given turf,
        determining a level of optimality for each of the optimal turfs with respect to reallocating the telecommunications technicians from each of the optimal turfs to the given turf, and
        generating visual cues in the graphical user interface highlighting each of the optimal turfs associated with a different shade of highlighting corresponding to the level of optimality associated with each of the optimal turfs.

9. The system of claim 8, wherein the optimal turfs are determined based on a distance between each of the other turfs of the plurality of turfs and the given turf.

10. The system of claim 8, wherein the optimal turfs are determined based on an ease with which a telecommunications technician is reallocated from each of the other turfs of the plurality of turfs to the given turf.

11. The system of claim 10, wherein the ease with which a telecommunications technician is reallocated comprises an availability of roads between each of the other turfs of the plurality of turfs and the given turf.

12. The system of claim 10, wherein the ease with which a telecommunications technician is reallocated comprises an amount of traffic on roads between each of the other turfs of the plurality of turfs and the given turf.

13. The system of claim 8, wherein the contact information of the field supervisor comprises a discipline associated with a skill set of the field supervisor.

14. The system of claim 8, wherein the contact information of the field supervisor comprises a name of the field supervisor, a work phone number of the field supervisor, and a cellular phone number of the field supervisor.

15. A non-transitory computer-readable medium storing instructions that, when executed by a processor, cause the processor to perform operations comprising:
displaying a graphical user interface, the graphical user interface displaying a plurality of turfs in a map presentation that provides a visual mapping of physical distances between each of the plurality of the turfs, wherein each of the plurality of turfs comprises a geographic area, and wherein each of a plurality of telecommunications technicians are assigned to one of the plurality of turfs;
receiving a selection of a given turf from the plurality of turfs through the graphical user interface;
upon receiving the selection of the given turf from the plurality of turfs,
determining other turfs of the plurality of turfs that are optimal turfs from where to reallocate telecommunications technicians to the given turf, and
displaying, via the graphical user interface, contact information of a field supervisor associated with the given turf,
determining a level of optimality for each of the optimal turfs with respect to reallocating the telecommunications technicians from each of the optimal turfs to the given turf; and
generating visual cues in the graphical user interface highlighting each of the optimal turfs associated with a different shade of highlighting corresponding to the level of optimality associated with each of the optimal turfs.

16. The non-transitory computer-readable medium of claim 15, wherein determining the other turfs of a plurality of turfs that are the optimal turfs comprises determining the other turfs of the plurality of turfs that are the optimal turfs based on a distance between each of the other turfs of the plurality of turfs and the given turf.

17. The non-transitory computer-readable medium of claim 15, wherein determining the other turfs of the plurality of turfs that are the optimal turfs comprises determining the other turfs of the plurality of turfs that are the optimal turfs based on an ease with which a telecommunications technician is reallocated from each of the other turfs of the plurality of turfs to the given turf.

18. The non-transitory computer-readable medium of claim 17, wherein the ease with which a telecommunications technician is reallocated comprises an availability of roads between each of the other turfs of the plurality of turfs and the given turf.

19. The non-transitory computer-readable medium of claim 17, wherein the ease with which a telecommunications technician is reallocated comprises an amount of traffic on roads between each of the other turfs of the plurality of turfs and the given turf.

20. The non-transitory computer-readable medium of claim 15, wherein the contact information of the field supervisor comprises a discipline associated with a skill set of the field supervisor.

* * * * *